United States Patent
Meyer

(10) Patent No.: US 6,854,354 B2
(45) Date of Patent: Feb. 15, 2005

(54) SHIFTING DEVICE FOR AN AUTOMOBILE GEARBOX

(75) Inventor: Jörg Meyer, Wagenfeld (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 311 days.

(21) Appl. No.: 10/019,346

(22) PCT Filed: May 3, 2001

(86) PCT No.: PCT/DE01/01663

§ 371 (c)(1),
(2), (4) Date: Dec. 24, 2001

(87) PCT Pub. No.: WO01/84018

PCT Pub. Date: Nov. 8, 2001

(65) Prior Publication Data

US 2004/0069088 A1 Apr. 15, 2004

(30) Foreign Application Priority Data

May 4, 2000 (DE) .......................................... 100 21 461

(51) Int. Cl.[7] ................................................ G50G 5/00
(52) U.S. Cl. ................................. 74/473.23; 74/473.24
(58) Field of Search .......................... 74/473.23, 473.24, 74/473.25, 473.21

(56) References Cited

U.S. PATENT DOCUMENTS 3,367,204 A * 2/1968 Chadwick II ............. 74/473.24
5,226,303 A * 7/1993 Dieden et al. ................. 70/247
5,428,977 A   7/1995 Knape .......................... 70/247
5,662,001 A * 9/1997 Smale ..................... 74/473.24

FOREIGN PATENT DOCUMENTS

| DE | 196 01 442 | 7/1997 |
| DE | 196 41 706 | 3/1998 |
| DE | 198 32 868 | 2/2000 |
| EP | 0 519 208 | 12/1992 |
| EP | 0 852 307 | 7/1998 |
| JP | 08-093897 A * | 4/1996 |

* cited by examiner

Primary Examiner—Thomas Williams
(74) Attorney, Agent, or Firm—McGlew and Tuttle, P.C.

(57) ABSTRACT

A shifting device for a motor vehicle transmission is provided comprising a selector lever for selecting different shift positions (P, R, N, D, 3, 2, . . . ). The lever is mounted in a housing pivotably around at least one axis. A first locking member and at least one additional locking member are provided as angle levers, each arranged on the housing pivotably around a respective pivot axis. The locking members block the movement of the selector lever in different shift positions. An adjusting member is provided. A locking element provided at the selector lever is engaged by one of the locking members in the shift positions of the selector lever which are to be locked as a function of preset parameters.

22 Claims, 3 Drawing Sheets

SHIFTING DEVICE FOR AN AUTOMOBILE GEARBOX

FIELD OF THE INVENTION

The present invention pertains to a motor vehicle transmission shifting device with a selector lever for selecting different shift positions (P, R, N, D, 3, 2, . . . ), which is mounted in a housing pivotably around at least one axis, locking members, which block the movement of the selector lever in different shift positions, an adjusting member as well as a locking element present at the selector lever and which is engaged by one of the locking members in the shift positions of the selector lever which are to be locked, as a function of preset parameters.

BACKGROUND OF THE INVENTION

Such shifting devices are used with increasing frequency for automatic transmissions or automated motor vehicle transmissions because of the driving comfort that can be achieved with them. However, vehicles equipped with the motor vehicle transmissions are frequently exposed to the risk of being used by unauthorized persons because they are usually loaded with options. Increased efforts are therefore made to protect the motor vehicles. This can be done in a great variety of ways. One possible solution is to protect the shifting device against unauthorized use by means of selector lever locks. These are thus used to secure the vehicle against theft or unauthorized use, on the one hand, and they can also be used, on the other hand, to avoid hazardous operating errors on the part of the driver of the vehicle himself.

Selector lever locks for shifting devices, e.g., as a "Keylock" and/or "Shiftlock," have been known; "Keylock" means that the selector lever is secured against movement in the parking position "P" and the ignition key for putting the motor vehicle into operation can be removed from the ignition lock in this parking position only.

By contrast, "Shiftlock" means that the selector lever can be moved from the parking position "P" and from a neutral position "N" only during the actuation of the brake and/or below a permissible speed limit in order to assume the selection function for other shift positions. This is achieved by means of locking members, which are actuated, e.g., individually or in a succession by program-controlled electromagnets. The shifting movement of the selector lever is thus possible in the case of such selector lever locks only as a function of preset parameters.

A shifting device for a motor vehicle transmission, in which both systems, "Shiftlock" and "Keylock," are used, has been known from DE 196 01 442 C2. The shifting device comprises a selector lever for selecting different shift positions (P, R, N, D, 3, 2, . . . ), which is mounted in a housing pivotably around an axis. A first locking member and two additional locking members block the movement of the selector lever in different shift positions as a function of preset parameters, i.e., e.g., below a maximum allowable speedlimit, in order to avoid the accidental selection of the reverse gear from a forward gear in this case. An adjusting member designed as an electromagnet is used to actuate the locking members, and the electromagnet has an armature, which can be extended from the housing of the electromagnet on both sides and thus forms a locking member each, which can engage recesses of the selector level, on each side. The selector lever itself, in which the recesses are provided, is used as the locking element.

The redundant system of a selector lever lock which is described in the document has a rather complicated design as an embodiment for a special application. One drawback of this solution is, furthermore, that three locking members are used.

SUMMARY OF THE INVENTION

The technical object of the present invention is to provide a shifting device that makes possible the locking of the selector lever in a simple manner in at least two shift positions.

According to the invention, a shifting device for a motor vehicle transmission Is provided comprising a selector lever for selecting different shift positions (P, R, N, D, 3, 2, . . . ). The lever is mounted in a housing pivotably around at least one axis. A first locking member and at least one additional locking member are provided as angle levers, each arranged on the housing pivotably around a respective pivot axis. The locking members block the movement of the selector lever in different shift positions. An adjusting member is provided. A locking element provided at the selector lever is engaged by one of the locking members in the shift positions of the selector lever which are to be locked as a function of preset parameters.

This very simple solution makes possible, e.g., the use of uniform components for numerous different shifting devices, so that it was possible to create quasi a modular system. The angle levers can be manufactured in a simple manner, may have identical design and can be fastened to the housing with a small assembly effort, so that, in particular, an inexpensive design can be made available with a shifting device according to the present invention.

Thus, it is meaningful in connection with the desired variety of variants of a shifting device according to the present invention to equip the locking members designed as angle levers with two arms which have an opening angle ($\alpha$) with one another may be between 0° and 180°. The locking members can thus be designed as straight, i.e., extensively rod-shaped components and as angle levers in the original sense, and a design in which the opening angle ($\alpha$) is approx. 90° is to be preferred based on the favorable leverages and the optimal installation situation. A drag bearing, which may also be introduced into the housing via the intermediary of a damping layer, is used to mount the pivot axis in the known manner.

The adjusting member preferably has a coupling with the locking members, which establishes an indirect or direct connection to the locking members. For example, it is also possible to provide a lever mechanism which would thus form an indirect connection of the adjusting member to the locking members.

It must be stressed here that at least in the case of a direct connection of the adjusting member to the locking members, the sections of the locking members that are connected to the corresponding adjusting member describe an arc during their pivoting movement, while the adjusting member preferably performs a linear movement. Various solutions are conceivable for compensating the relative movement that is consequently present. Thus, the connection may be designed in the form of a ball-and-socket joint, or the adjusting member or the locking members are mounted in a limitedly movable manner.

According to another embodiment of the present invention, the locking members have an elevated engaging contour on their side facing the locking element. This engaging contour can be engaged with an approximately complementary recess of the locking element. An engaging contour of rectangular cross section or a sawtooth-like or any other engaging contour, which extends behind or engages a corresponding matching contour of the locking element, would be possible as an embodiment of this feature of the present invention.

To facilitate the introduction or removal movements of the locking members, it is, furthermore, proposed that sliding surfaces, on which the elevated engaging contours of the locking members can slide along until they are received in the locking element, be provided on the locking element.

Furthermore, provisions are made in a special embodiment of the present invention for the selector lever to have a strap-like section, on the outer contour of which at least one locking element is fastened at least on one side. Such a design of the selector lever makes it possible to further increase the variety of variants. Thus, the locking element may be provided on both sides of the selector level on the strap-like section, so that a shifting device according to the present invention can be used for vehicles with the steering wheel on the right as well as for vehicles with the steering wheel on the left, without the entire shifting device having to be modified. In a continuation of this basic idea, corresponding precautionary measures are taken on the housing for mounting the locking members as well as for fastening the locking members, so that the individual components can be arranged on one side of the shifting device or the other, e.g., by means of detachable connections, which considerably facilitates the changeover of the assembly process. The locking members should also be designed in this sense as identical components, which are fastened to the housing only in the opposite direction. Thus, the shifting device as a whole has a modular design in the manner of a modular system.

Components with various principles of action, e.g., mechanical, hydraulic, pneumatic or electric components, may be used as the adjusting member. A very simple possibility is seen here in using as the adjusting member an electromagnet with an armature that is pretensioned by means of a spring and can be extended from its housing on both sides in the axial direction.

This electromagnet should advantageously have an armature extended on one side in the currentless state, so that, e.g., the locking member and the locking element engage one another in the shift position "P" of the shifting device.

One exemplary embodiment of the present invention will be explained in greater detail below with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
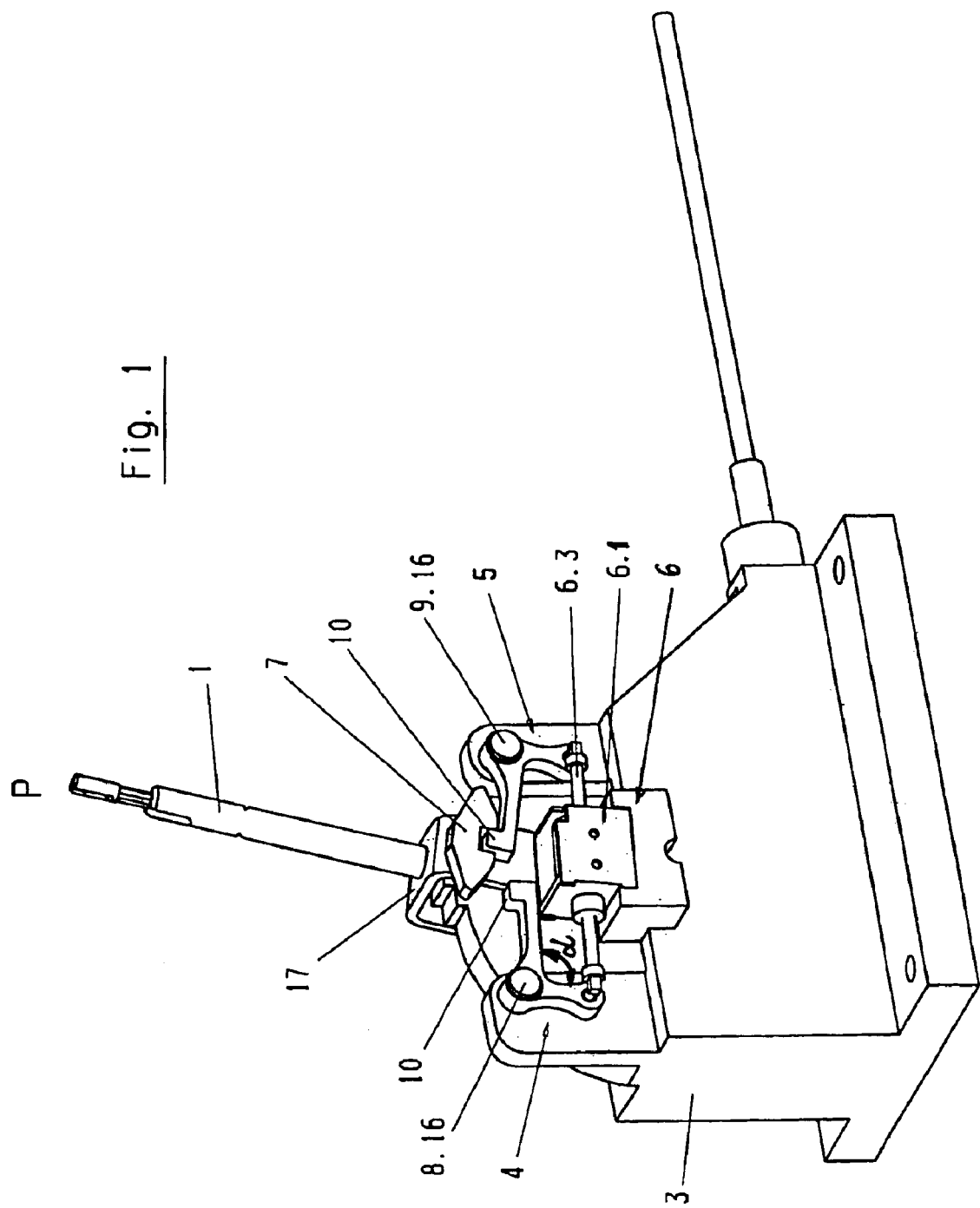
FIG. 1 is a three-dimensional view of a design of a shifting device according to the present invention which is shown in a simplified form.
Figure 2:
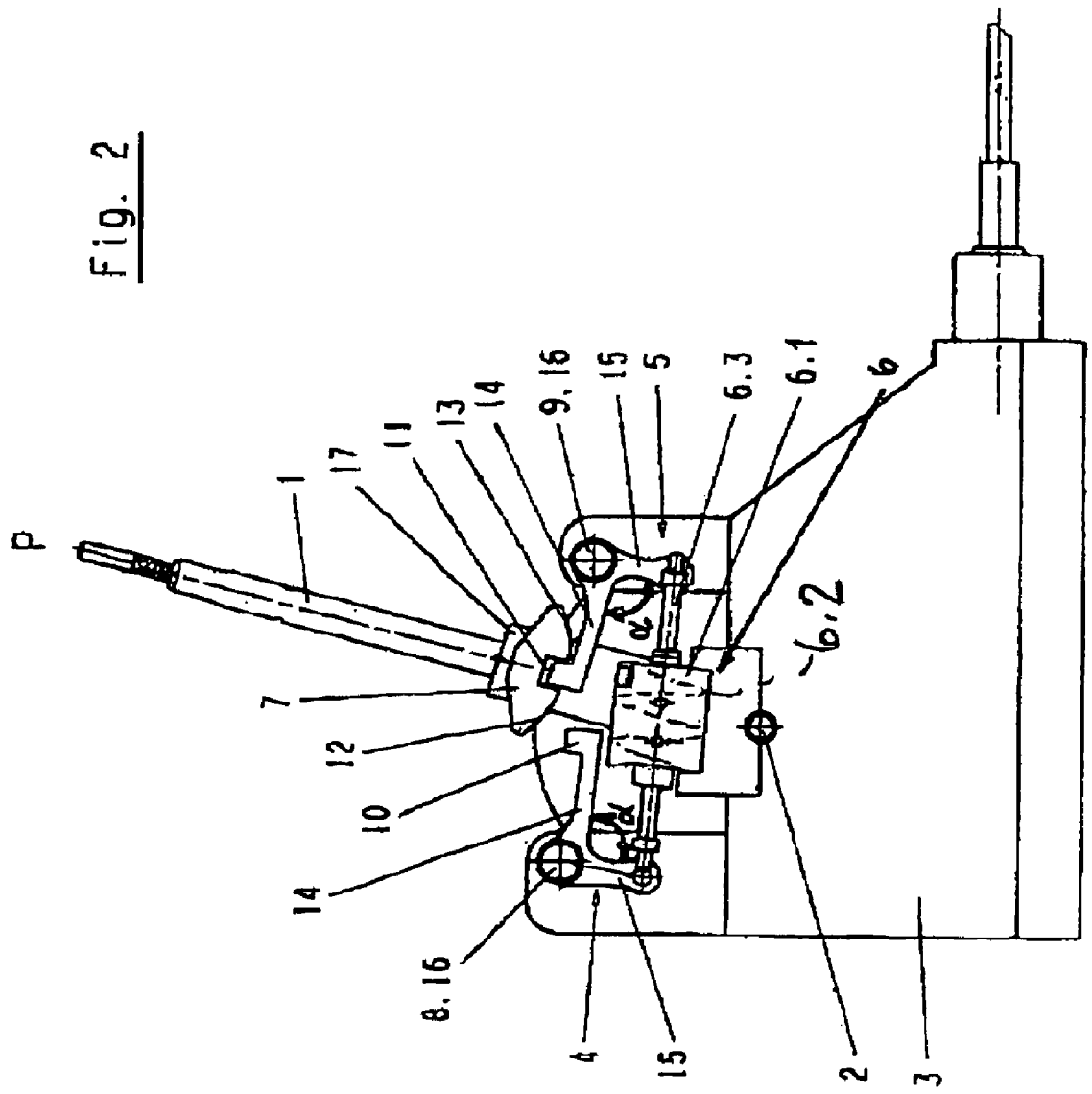
FIG. 2 is a side view in which the selector lever is in shift position "P;"
Figure 3:
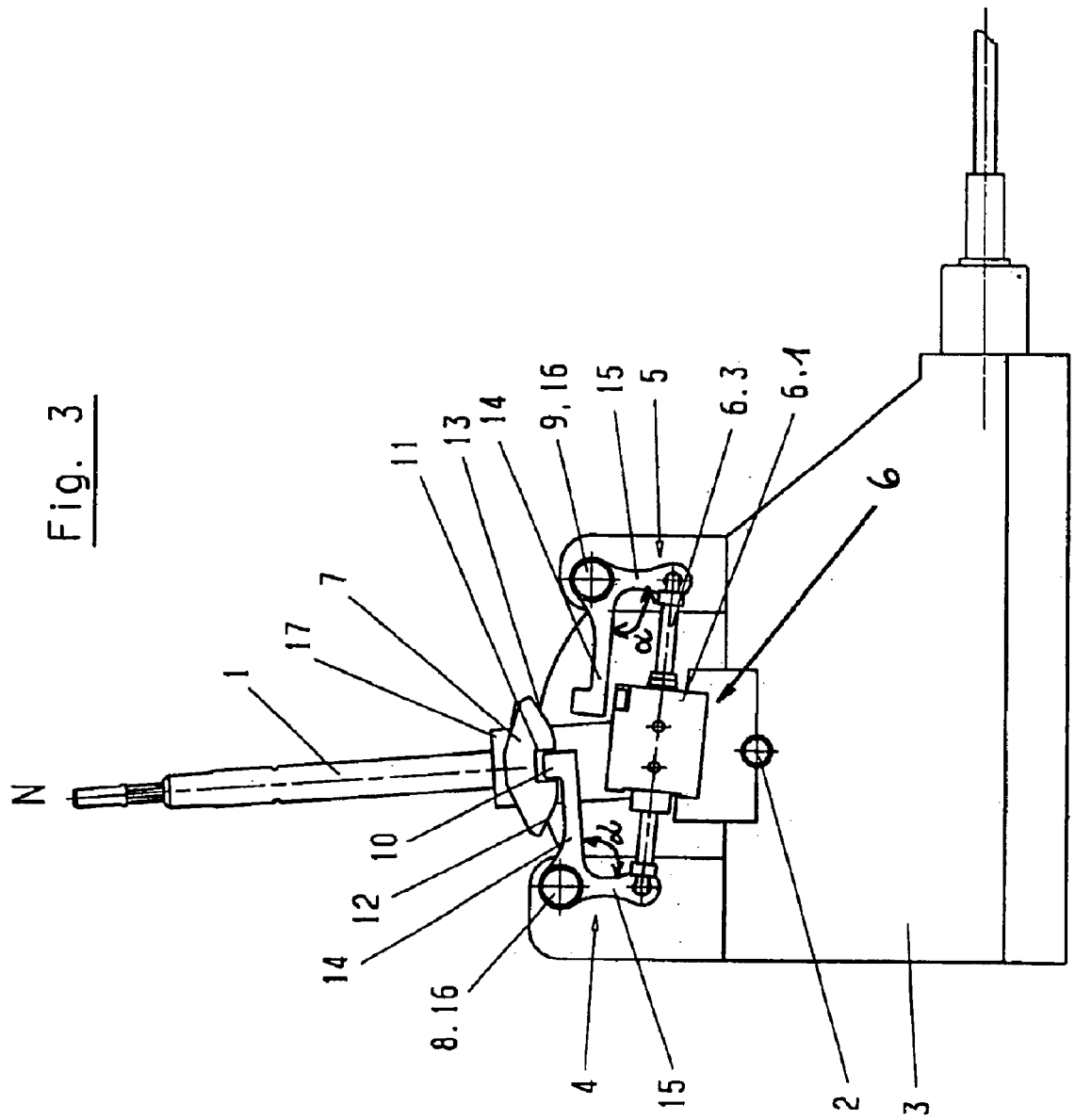
FIG. 3 is a side view in which the selector lever is in shift position "N."

Referring to the drawings in particular, the simplified view of a shifting device according to the present invention which is shown in the figures comprises a selector lever 1, which is mounted in a housing 3 pivotably around an axis 2 that can be best recognized in FIGS. 2 and 3. This design of a shifting device has only one shift gate and was designed as an automatic shifting device, in which the signals are detected and transmitted electronically. To displace selector lever locks, which should be possible in this case in the shift positions "P" and "N," two locking members 4 and 5 are fastened to an outer contour of the housing 3 pivotably around a pivot axis 8 and 9 each. The pivot axes 8, 9 are mounted in a rubber-jacketed drag bearing 16 each. The selector lever 1 has a strap-like section 17, on the outer surface of which a locking element 7 is fastened on one side. This locking element 7 has a recess 11, with which an engaging contour 10 each, which is made in one piece with the locking members 4, 5, can be engaged. Furthermore, the locking element 7 is equipped with sliding surfaces 12, 13, which are to facilitate the engaging and disengaging movement of the locking members 4, 5 and to guide same at the same time, at least in some sections. The locking members 4 and 5, which have an identical design but have locking members 4 and 5 mounted opposite each other on the housing, have two arms 14, 15 each, which form an opening angle ($\alpha$) equaling approximately 90° with one another. At the arms 15 of the locking members 4, 5 located under the pivot axis 8, 9, these are connected to an adjusting member 6, which is an electromagnet in this case. This comprises a housing 6.1, an armature 6.3, which exits from the housing on both sides, is axially movable and is pretensioned within the housing 6.1 by means of a spring 6.2 not visible in the views.

Such a shifting device shall have an armature 6.3 that is extended on one side and is correspondingly retracted on the opposite side of the housing 6.1 in the currentless state of the electromagnet, so that the currentless lock of the selector lever shown in FIG. 2 can be embodied. If the vehicle is started by the driver of the vehicle and current is thus supplied, the armature is moved only when a signal for the actuated brake pedal is additionally present. The signal control and processing takes place in the known manner via a central control unit (CPU), which will not be described here in greater detail. After the electromagnet 6 has pivoted the angle lever 5 around the pivot axis 9 due to the movement of the armature, the selector lever 1 is released and a gear can be selected.

The reverse gear "R," which is located behind the shift position "N" when viewed in the direction of travel, can correspondingly be selected only when the electromagnet 6 extends the armature 6.3 in the shift position "N" such that the position of the locking member 4 and the locking element 7 shown in FIG. 3 is disengaged. The release of the selector lever can be linked with conditions or preset parameters, e.g., a speed below a speed limit of 5 km/hour. Shifting errors and consequently damage to the motor vehicle transmission can thus be avoided.

Finally, an adjusting member 6 actuates two (or more) locking members 4, 5 simultaneously via a coupling in a shifting device according to the present invention, and the locking element 7 present at the selector lever 1 is being engaged by at most one locking member 4 or 5.

While a specific embodiment of the invention has been shown and described in detail to illustrate the application of the principles of the invention, it will be understood that the invention may be embodied otherwise without departing from such principles.

What is claimed is:

1. A shifting device for a motor vehicle transmission, the shifting device comprising:
    a housing;
    a selector lever for selecting different shift positions, said selector lever being mounted in said housing pivotably around at least one axis;
    a first locking member comprising an angle lever arranged on said housing pivotably around a first locking member pivot axis;
    an additional locking member comprising an additional angle lever arranged on said housing pivotably around an additional locking member pivot axis, said first locking member and said additional locking member blocking the movement of the selector lever in different shift positions;
    an adjusting member; and
    a locking element connected with said selector lever for movement together and pivoting movement of said locking element with said selector lever, said locking element being engaged by one of said first locking member and said additional locking member in the shift positions of the selector lever which are to be locked, locking said locking element and said selector lever as a function of preset parameters.

2. A shifting device in accordance with claim 1, wherein said angle levers each have two arms which form an opening angle (α) between 0° and 180° with one another and said angle levers each have a connection section with a drag bearing.

3. A shifting device in accordance with claim 1, wherein said adjusting member is coupled with said locking members.

4. A shifting device in accordance with claim 1, wherein said first locking member and said additional locking member each have a side facing said locking element with an elevated engaging contour which can be engaged with an approximately complementary recess of the said locking element.

5. A shifting device in accordance with claim 1, wherein said locking element has sliding surfaces to facilitate the engaging and disengaging movements of the said first locking member and said additional locking member with said locking element.

6. A shifting device in accordance with claim 1, wherein said selector lever has a strap-shaped section having an outer contour with said locking element fastened at least on one side.

7. A shifting device comprising:
    a housing;
    a selector lever for selecting different shift positions, said selector lever being mounted in said housing pivotably around at least one axis;
    a first locking member comprising an angle lever arranged on said housing pivotably around a first locking member pivot axis;
    an additional locking member comprising an additional angle lever arranged on said housing pivotably around an additional locking member pivot axis, said first locking member and said additional locking member being substantially identical components and said first locking member extending in a direction substantially opposite to said additional locking member said first locking member and said additional locking member blocking the movement of the selector lever in different shift positions;
    an adjusting member; and
    a locking element associated with said selector lever and engaged by one of said first locking member and said additional locking member in the shift positions of the selector lever which are to be locked, as a function of preset parameters.

8. A shifting device in accordance with claim 1, wherein said adjusting member is an electromagnet with an electromagnet housing and an armature which can be extended from said electromagnet housing on both sides in the axial direction, said armature being pretensioned by a spring.

9. A shifting device in accordance with claim 8, wherein said electromagnet armature extends on one side in a currentless state, so that the first locking member and said locking element engage each other in a shift position "P" of the shifting device.

10. A shifting device in accordance with claim 1, wherein the shifting device is a module for use in a modular system.

11. A shifting device for a motor vehicle transmission, the shifting device comprising:
    a support;
    a selector lever for selecting different shift positions, said selector lever being pivotably mounted to said support around at least one axis;
    a first locking member comprising an angle lever supported relative to said support and pivotable around a first locking member pivot axis, said first locking member having a first locking member arm with an engaging contour and having another first locking member arm;
    an additional locking member comprising an additional angle lever supported relative to said support and pivotable around an additional locking member pivot axis, said additional locking member having an additional locking member arm with an engaging contour and having another locking member arm, said first locking member and said additional locking member blocking the movement of the selector lever in different shift positions via said engaging contour of said first locking member and via said engaging contour of said additional locking member;
    an adjusting member connected to said first locking member via said another first locking member arm and said additional locking member via said another locking member arm for adjusting the position of said first locking member and said additional locking member; and
    a locking element associated with said selector lever and engaged by one of said first locking member and said additional locking member in the shift positions of the selector lever which are to be locked, as a function of preset parameters.

12. A shifting device in accordance with claim 11, wherein said arms of said angle levers form an opening angle (α) between 0° and 180° with one another and said angle levers each have a connection section with a drag bearing.

13. A shifting device in accordance with claim 11, wherein each said engaging contour can be engaged with an approximately complementary recess of the said locking element.

14. A shifting device in accordance with claim 11, wherein said locking element has sliding surfaces to facilitate the engaging and disengaging movements of the said first locking member and said additional locking member with said locking element.

15. A shifting device in accordance with claim 11, wherein said selector lever has a section with an upper part and side parts having an outer contour with said locking element fastened at least on one side part.

16. A shifting device in accordance with claim 11, wherein said first locking member and said additional locking member are identical components.

17. A shifting device in accordance with claim 11, wherein said adjusting member is an electromagnet with an electromagnet housing and an armature which can be extended from said electromagnet housing on both sides in the axial direction, said armature being pretensioned by a spring.

18. A shifting device in accordance with claim 17, wherein said electromagnet armature extends on one side in a currentless state, so that the first locking member and said locking element engage each other in a park shift position of the shifting device.

19. A shifting device for a motor vehicle transmission, the shifting device comprising:
   a housing;
   a selector lever for selecting different shift positions, said selector lever being mounted in said housing pivotably around at least one axis;
   a first locking member comprising an angle lever arranged on said housing pivotably around a first locking member pivot axis;
   a second locking member comprising a second angle lever arranged on said housing pivotably around an additional locking member pivot axis said first locking member and said second locking member blocking the movement of the selector lever in different shift positions;
   an adjusting member connected to said first locking member and connected to said second locking member forming the only adjusting means for adjusting a position of said first locking member and said second locking member for blocking the movement of the selector lever in different shift positions; and
   a locking element associated with said selector lever and engaged by one of said first locking member and said second locking member in the shift positions of the selector lever which are to be locked, as a function of preset parameters.

20. A shifting device according to claim 19, wherein said first locking member and said second locking member are substantially identical components and said first locking member extends in a direction substantially opposite to said second locking member.

21. A shifting device according to claim 19, wherein, said first locking member has a first locking member arm with an engaging contour and has a second locking member arm and said second locking member has a second locking member first arm with an engaging contour and has a second locking member second arm, said first locking member and said second locking member blocking the movement of said selector lever in different shift positions via said engaging contour of said first locking member and via said engaging contour of said second locking member, said adjusting member being connected to said first locking member via said first locking member second arm and via said second locking member second arm.

22. A shifting device for a motor vehicle transmission, the shifting device comprising:
   a support;
   a selector lever for selecting different shift positions, said selector lever being pivotably mounted to said support around at least one axis;
   a first locking member comprising an angle lever supported relative to said support and pivotable around a first locking member pivot axis;
   an additional locking member comprising an additional angle lever supported relative to said support and pivotable around an additional locking member pivot axis, said first locking member and said additional locking member blocking the movement of the selector lever in different shift positions;
   an adjusting member comprising an electromagnet with an electromagnet housing and an armature which can be extended from said electromagnet housing on both sides in the axial direction, said armature being connected to said first locking member and said additional locking member for adjusting the position of said first locking member and said additional locking member; and
   a locking element associated with said selector lever and engaged by one of said first locking member and said additional locking member in the shift positions of the selector lever which are to be locked, as a function of preset parameters.

* * * * *